(12) United States Patent
Gilliland et al.

(10) Patent No.: US 8,452,184 B2
(45) Date of Patent: May 28, 2013

(54) RADIAL OPTICAL DATA INTERCHANGE PACKAGING

(75) Inventors: Don A. Gilliland, Rochester, MN (US); David B. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/849,927

(22) Filed: Aug. 4, 2010

(65) Prior Publication Data

US 2012/0033373 A1 Feb. 9, 2012

(51) Int. Cl.
*H04B 10/00* (2006.01)

(52) U.S. Cl.
USPC ........... 398/135; 398/164; 398/138; 398/139; 398/128; 398/130; 398/59; 398/60; 385/88; 385/89; 385/90; 385/92; 385/93; 361/818; 361/619; 361/699; 361/679.32

(58) Field of Classification Search
USPC ................. 398/164, 135, 136, 137, 138, 139, 398/141, 45, 47, 48, 49, 63, 128, 130, 54, 398/46, 50, 51, 56, 57, 58, 62, 64, 66, 67, 398/68, 79, 59, 61; 385/24, 16, 17, 18, 14, 385/88, 90, 92, 93, 89; 361/818, 619, 699, 361/809, 810, 679.32

See application file for complete search history.

(56) References Cited

U.S. PATENT DOCUMENTS

| 6,931,211 B2 * | 8/2005 | English et al. ................. 398/164 |
| 2005/0100340 A1 * | 5/2005 | Nishimura ..................... 398/135 |
| 2011/0262135 A1 * | 10/2011 | Boduch et al. .................. 398/45 |

\* cited by examiner

*Primary Examiner* — Hanh Phan
(74) *Attorney, Agent, or Firm* — Jim Boice

(57) ABSTRACT

A radial optical data interchange packaging comprises a central core; a plurality of central core photo transceivers emerging from an exterior side surface of the central core; a mother board coupled to the central core, wherein the mother board is perpendicularly oriented below and abutting the central core; a plurality of retention slots on the mother board, wherein the retention slots radially extend away from the central core; and a plurality of cards held by the retention slots, wherein each of the plurality of cards comprises a set of card photo transceivers that optically communicate with the central core photo transceivers.

20 Claims, 5 Drawing Sheets

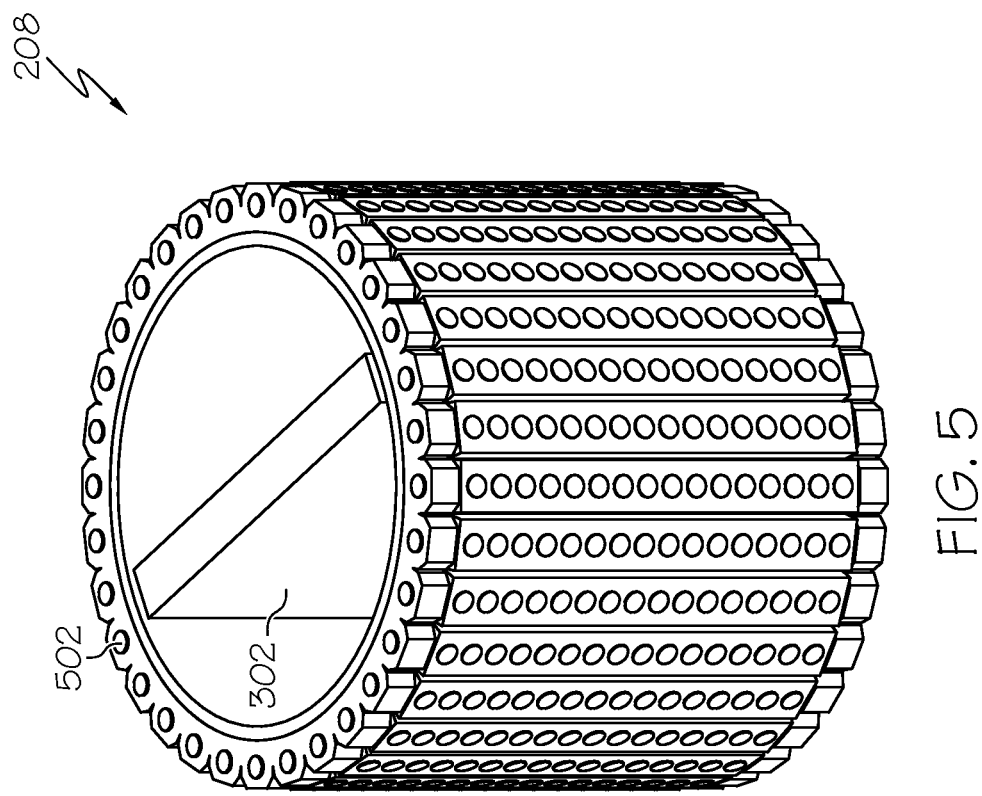

RADIAL OPTICAL DATA INTERCHANGE PACKAGING

BACKGROUND

The present disclosure relates to the field of computers, and specifically to computers having multiple circuit boards. Still more particularly, the present disclosure relates to communicatively coupling circuit boards in a computer system.

BRIEF SUMMARY

In one embodiment of the present disclosure, a radial optical data interchange packaging comprises a central core; a plurality of central core photo transceivers emerging from an exterior side surface of the central core; a mother board coupled to the central core, wherein the mother board is perpendicularly oriented below and abutting the central core; a plurality of retention slots on the mother board, wherein the retention slots radially extend away from the central core; and a plurality of cards held by the retention slots, wherein each of the plurality of cards comprises a set of card photo transceivers that optically communicate with the central core photo transceivers.

In one embodiment of the present disclosure, an optical rack comprises a first mother board and a second mother board, wherein the first mother board is inter-coupled to the second mother board by a first central core and a second central core, and wherein the first mother board is perpendicularly oriented below and abutting the first central core and the second mother board is perpendicularly oriented below and abutting the second central core; a plurality of central core photo transceivers emerging from exterior side surfaces of the first and second central cores; a plurality of retention slots on the first and second mother boards, wherein the retention slots radially extend away from the first and second central cores; and a plurality of cards held by the retention slots, wherein each of the plurality of cards comprises a set of card photo transceivers that optically communicate with the central core photo transceivers on the first and second central cores.

In one embodiment of the present disclosure, a computer system comprises an optical rack that comprises: a first mother board and a second mother board, wherein the first mother board is inter-coupled to the second mother board by a first central core and a second central core, and the first mother board is perpendicularly oriented below and abutting the first central core and the second mother board is perpendicularly oriented below and abutting the second central core; a plurality of central core photo transceivers emerging from exterior side surfaces of the first and second central cores; a plurality of retention slots on the first and second mother boards, wherein the retention slots radially extend away from the first and second central cores; and a plurality of cards held by the retention slots, wherein each of the plurality of cards comprises a set of card photo transceivers that optically communicate with the central core photo transceivers on the first and second central cores.

BRIEF DESCRIPTION OF THE SEVERAL VIEWS OF THE DRAWINGS

FIG. 5 illustrates additional detail of the central core.

DETAILED DESCRIPTION

Figure 1:
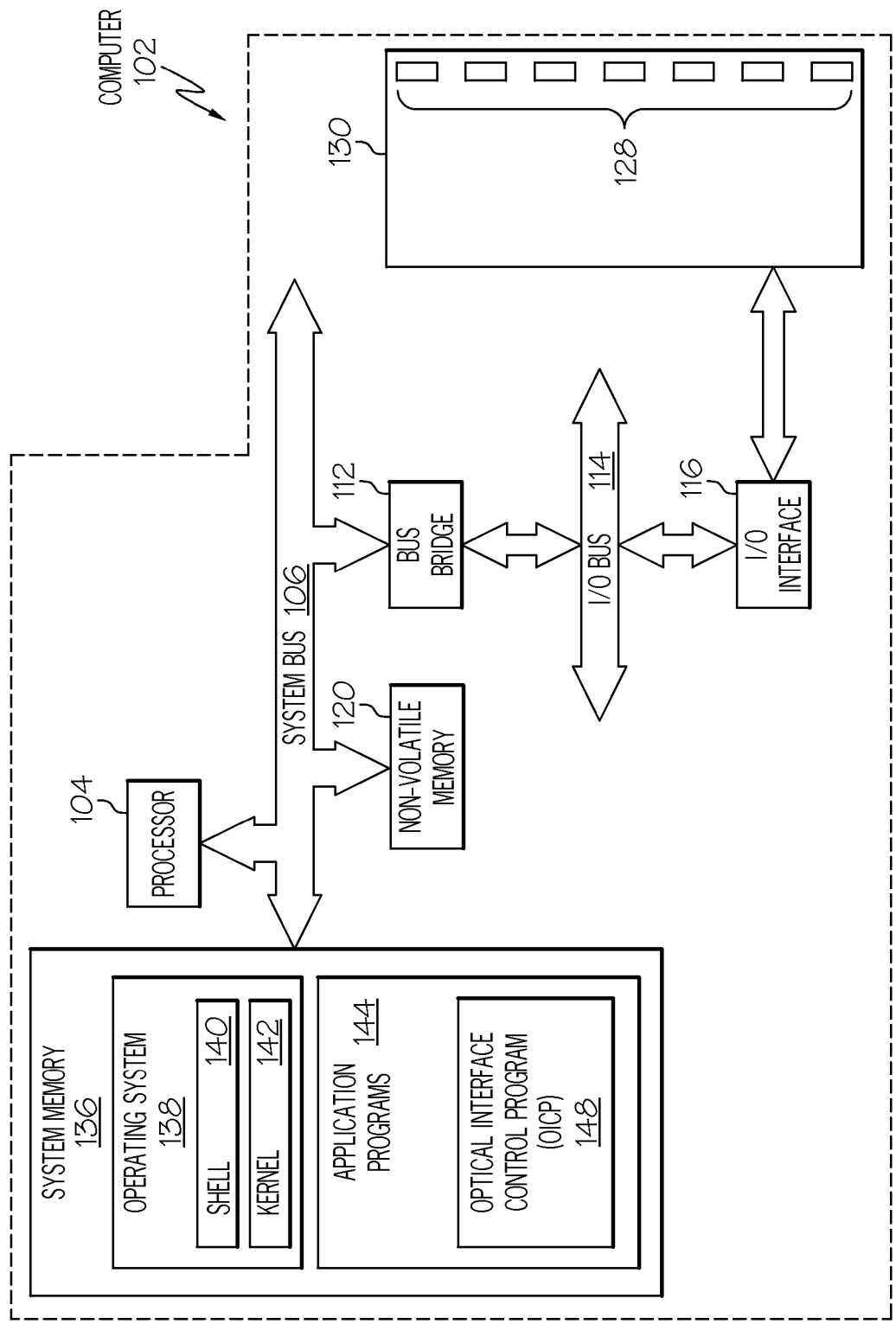
FIG. 1 depicts details of an exemplary computer that may be utilized by the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by a card 206 (shown in FIG. 2) and/or an optical link chip 302 (shown in FIG. 3).

Computer 102 includes a processor 104 that is coupled to a system bus 106. Processor 104 may utilize one or more processors, each of which has one or more processor cores. System bus 106 is coupled via a bus bridge 112 to an input/output (I/O) bus 114. An I/O interface 116 is coupled to I/O bus 114. I/O interface 116 affords communication with various I/O devices, including an optical interface 130. Optical interface 130 comprises an array of optical transducers 128 used to optically communicate digital and/or analog information to and from the computer 102. In one embodiment, optical interface 130 is an integral component of processor 104, thus providing a very high speed communication between the optical transducers 128 and a core (not depicted) of the processor 104. A system memory 136, which is defined as a lowest level of volatile memory in computer 102, includes additional higher levels of volatile memory (not shown), including, but not limited to, cache memory, registers and buffers. Data that populates system memory 136 includes computer 102's operating system (OS) 138 and application programs 144. Such data may be from a non-volatile memory 120 (e.g., read only memory—ROM, programmable ROM—PROM, etc.), or such data may be directly downloaded from an external source (not shown), or such data may be from a local hard disk drive, CD-ROM drive, etc. (also not shown).

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include an optical interface control program (OICP) 148. OICP 148 includes code for implementing the processes described below, including those described with FIGS. 2-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
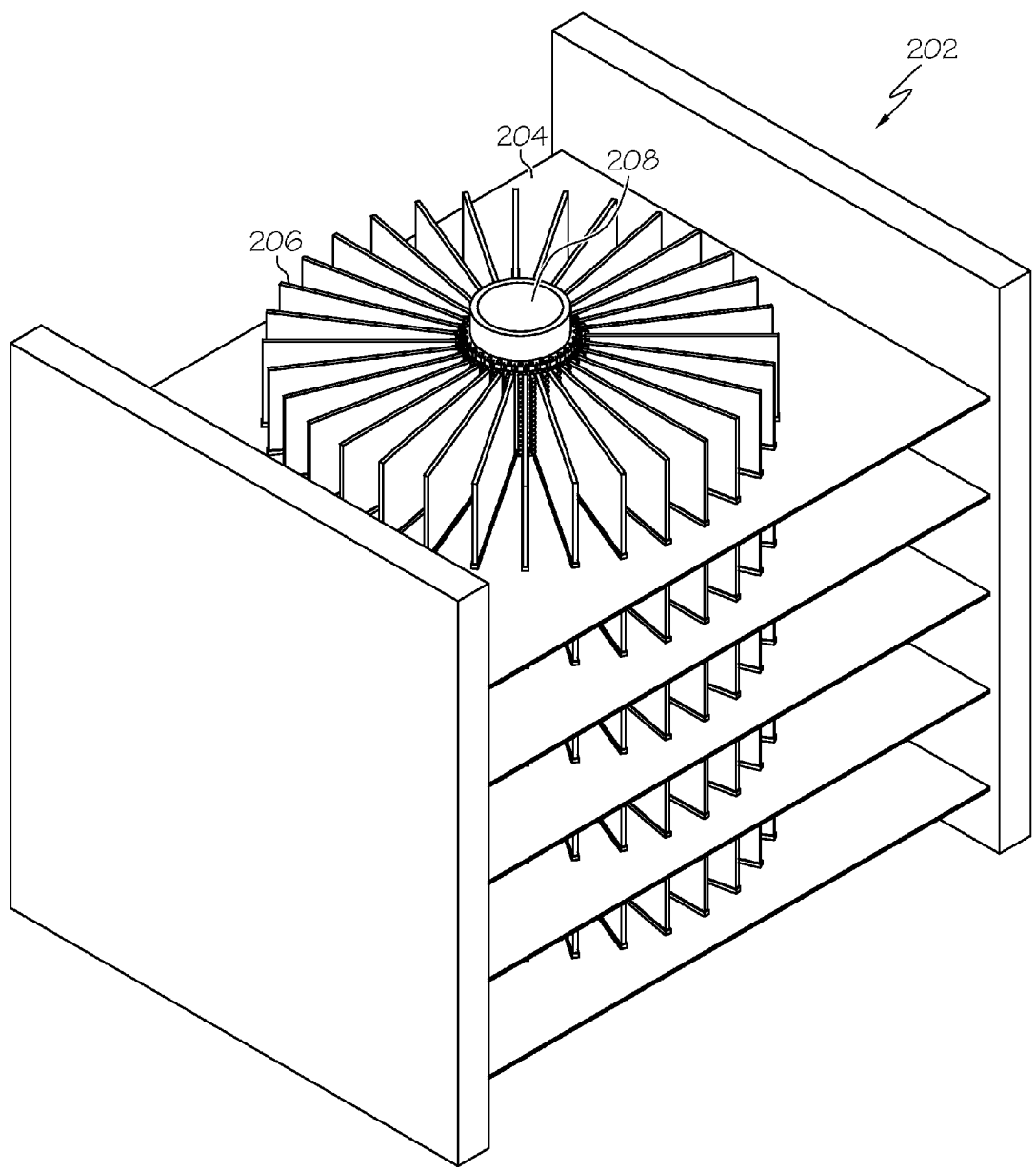
FIG. 2 depicts an exemplary optical rack holding multiple mother boards.

With reference now to FIG. 2, an exemplary radial optical data interchange packaging is depicted as one or more components of optical rack 202, as described herein. Optical rack 202 is shown holding multiple mother boards, including the labeled mother board 204. Each mother board supports multiple cards, including labeled card 206. These cards may be server blades (e.g., computer 102 shown in FIG. 1), power supplies, memory cards, input/output cards, etc. Each card may be dedicated to single function, such as processing, memory, input/output functions, etc., or a card may be a multifunctional card (e.g., a server blade). Similarly, each mother board may be dedicated to holding a single type of card (e.g., only memory cards), or various mother boards may hold different types of cards (e.g., a combination of server cards, memory cards, I/O cards, etc.).

As depicted in FIG. 2, the cards (including labeled card 206) extend radially away from a central core 208, thus minimizing communication distances. Each central core (e.g., central core 208) is able to optically communicate with other central cores, as described further herein. Thus, the optical rack 202 comprises optical communication between different books/racks/floors/layers (e.g., areas in which a different mother board is located) as well as among various cards, including cards on a same mother board as well as cards on different mother boards. In one embodiment, central core 208 is a cylinder having a circular cross section, as depicted in FIG. 2. In other embodiments, central core 208 has a square, rectangular, oval, or other geometric cross section.

Figure 3:
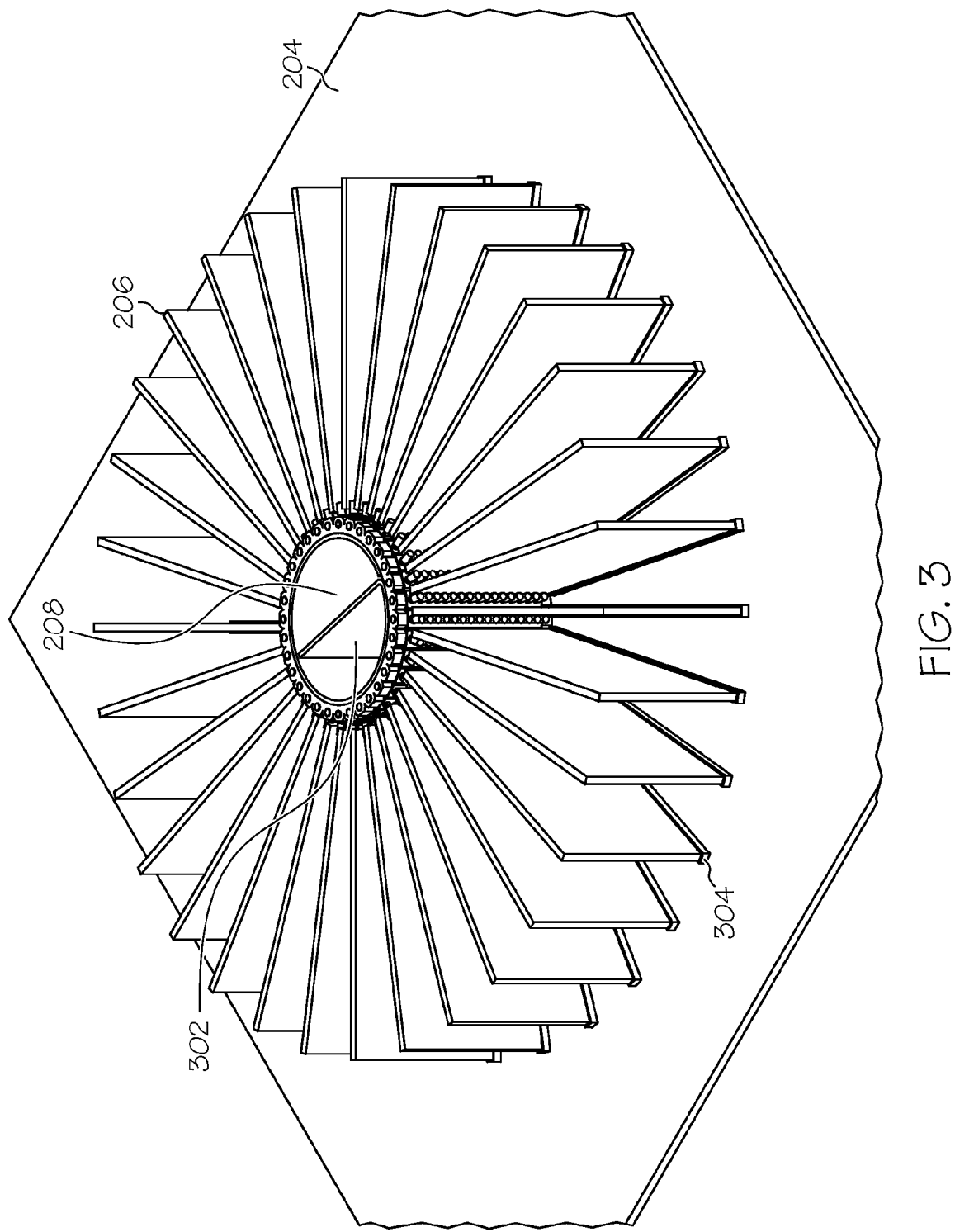
FIG. 3 illustrates additional detail of a mother board, cards on the mother board, and a central core that is photo electrically coupled to the cards.

Referring now to FIG. 3, additional detail of mother board 204, cards (e.g., card 206) on mother board 204, and central core 208 is presented. Each card (e.g. card 206) is mounted on its edge in a retention slot 304. In one embodiment, each retention slot 304 provides only mechanical support for a card 206. In another embodiment, a retention slot 304 provides additional electrical support for a card 206, including power, ground, etc.

Figure 4:
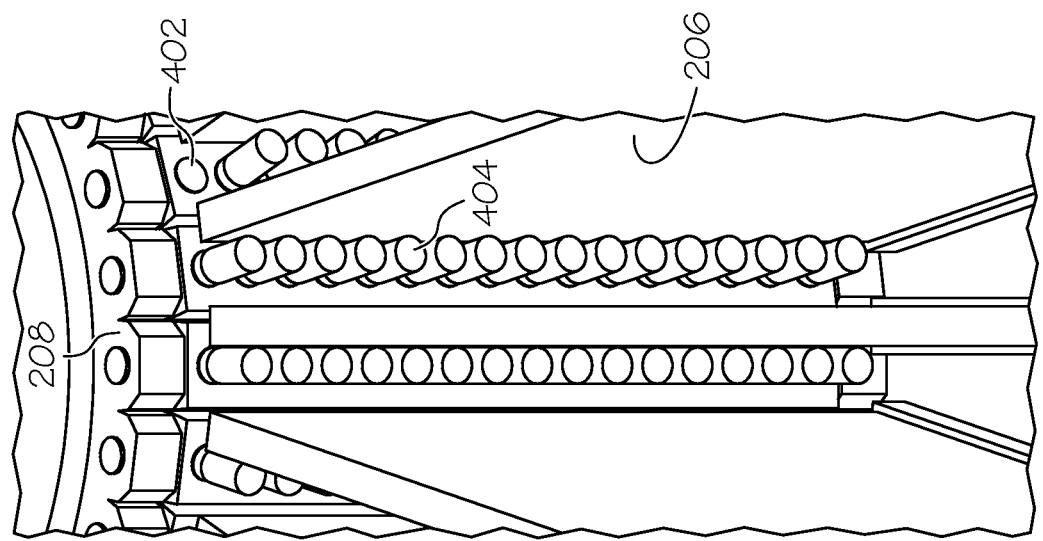
FIG. 4 depicts additional detail of the photoelectric coupling of the cards to the central core.

FIG. 4 presents an enlarged view of the middle of FIG. 3, and presents additional detail of arrays of photo transceivers, including those depicted as central core photo transceiver 402 and card photo transceiver 404, that carry data and clock information from the cards to the central core 208. Note that the central core photo transceivers (including element 402) emerge from an exterior side surface of the central core 208. The array of card photo transceivers (including element 404) are mounted to an edge of the card 206, and mate up against the central core photo transceivers for optical communication connection. The central core 208, as depicted in FIG. 5, also features an array of optical transceivers on the top and bottom sides, including the depicted inter-core optical transceiver 502. These inter-core optical transceivers provide an interconnect between books/drawers/layers/mother boards in the system housed by the optical rack 202 (shown in FIG. 2) in order to pass clock and data.

Note that the optical transceivers (elements 128 in FIG. 1, elements 402 and 404 in FIG. 4, and element 502 in FIG. 5) may be any of various types of optical transceivers. For example, in one embodiment an optical transceiver may simply be a terminating end of an optic fiber, which may be outfitted to feature multiple laser diodes of differing wavelengths to provide multiple communications channels per element. In one embodiment, an optical transceiver may comprise a light emitting diode that responds to a current from a metal wire. In one embodiment, a transceiver may comprise any type of photoreceptor (e.g., a photo resistor, a photo diode, a photo transistor, etc.) that responds to light inputs in a known and consistent manner. Thus, the transceivers described herein may be any combination of metal wire, optic fiber, and/or optic interfaces used to optically communicate information, both digital as well as analog.

Returning to FIG. 3, note that an optical link chip (OLC) 302 is oriented within the central core 208. OLC 302 controls the routing of signals to various cards via various photo transceivers. That is, within central core 208 are multiple optic fibers and/or metal wires. Signals coming through these fibers/wires are directed to the OLC 302, which then sends the signal to the appropriate photo transceivers, including elements 402, 502 and, indirectly, 404 (depicted in FIGS. 4 and 5) as described herein. Thus, a signal may be directed to a particular card via OLC-selected pairs of central core photo transceivers 402 and card photo transceivers 404. Similarly, OLC 302 can direct inter-core/layer communication by directing signals between inter-core optical transceivers 502. This inter-core/layer communication is achieved by passing light signals through holes (not shown) that have been drilled into the mother boards.

Utilizing the features described herein, one embodiment of the present disclosure is an innovative architecture to provide a central optical interconnect between processor books (sets of cards on different mother boards) in a supercomputing environment. The architecture described herein provides increased speed for communication between cards, and eliminates problems that accompany high-speed copper-based signaling. This results in a reduction of complications resulting from the issues related to signal integrity and electromagnetic compatibility. The architecture described herein also simplifies the physical design layout process, requiring fewer signal layers. Arranged in a radial fashion, the edge of each processor card is outfitted with an array of optical transceivers. These communicate with a central core, which is outfitted with an array of optical transceivers for each processor card.

As described in one embodiment herein, optical transceivers are also placed on the top/bottom of the central core to provide an optical communication link between drawers. As noted in the illustrations of the present disclosure, the drawer's planar may be of a rectangular shape. Placement of the high speed computing and communication channels (including wiring, optic fibers, optical transceivers, etc. described herein) central to the machine in which the radial optical data interchange packaging is housed allows lower electromagnetic emissions (EME) since higher speed transitions off the mother boards via copper to optical conversion or electronics switching is located close to the center of the circuit board (drawer board). This allows board attenuation to occur as signal energy drops as one moves away from the center of communication.

To provide the maximum amount of bandwidth, each optical element in the array may be outfitted with several laser diodes and photodiodes of varying wavelengths. This enables multiple channels of communication for each element. Note that in one embodiment, if optical transceivers are integrated within the processor itself (e.g., OLC 302), the proximity of the modules to the central core avoids the copper between the processor and optical modules at the card to core edge.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described embodiments of the invention of the present application in detail and by reference to illustrative embodiments thereof, it will be apparent that modifications and variations are possible without departing from the scope of the invention defined in the appended claims.

What is claimed is:

1. A radial optical data interchange packaging comprising:
a first central core;
a plurality of central core photo transceivers emerging from an exterior side surface of the first central core;
a first mother board coupled to the first central core, wherein the first mother board is perpendicularly oriented below and abutting the first central core;
a plurality of retention slots on the first mother board, wherein the retention slots radially extend away from the first central core; and
a plurality of cards held by the retention slots, wherein each of the plurality of cards comprises a set of card photo transceivers that optically communicate with the central core photo transceivers.

2. The radial optical data interchange packaging of claim 1, further comprising:
a first plurality of inter-core optical transceivers emerging from a first end of the first central core;
a second plurality of inter-core optical transceivers emerging from a second end of a second central core, wherein the first central core is positioned above the first mother board and the second central core is positioned below the first mother board;

a second mother board perpendicularly oriented below and abutting the second central core; and a plurality of light passageways through the first mother board, wherein the light passageways afford optical communication between the first central core and the second central core.

3. The radial optical data interchange packaging of claim 1, further comprising:

an optical link chip associated with the first central core, wherein the optical link chip directs routing of optic signals to different central core photo transceivers and card photo transceivers.

4. The radial optical data interchange packaging of claim 1, wherein the central core photo transceivers comprise ends of optic fibers.

5. The radial optical data interchange packaging of claim 1, wherein the central core photo transceivers comprise light emitting diodes powered by current from metal wires.

6. The radial optical data interchange packaging of claim 1, wherein each of the central core photo transceivers comprise multiple light emitting diodes capable of producing different wavelengths.

7. The radial optical data interchange packaging of claim 1, wherein the card photo transceivers comprise photoreceptors.

8. An optical rack comprising;

a first mother board and a second mother board, wherein the first mother board is inter-coupled to the second mother board by a first central core and a second central core, and wherein the first mother board is perpendicularly oriented below and abutting the first central core and the second mother board is perpendicularly oriented below and abutting the second central core;

a plurality of central core photo transceivers emerging from exterior side surfaces of the first and second central cores;

a plurality of retention slots on the first and second mother boards, wherein the retention slots radially extend away from the first and second central cores; and a plurality of cards held by the retention slots, wherein each of the plurality of cards comprises a set of card photo transceivers that optically communicate with the central core photo transceivers on the first and second central cores.

9. The optical rack of claim 8, further comprising:

a first plurality of inter-core optical transceivers emerging from a first end of the first central core;

a second plurality of inter-core optical transceivers emerging from a second end of the second central core, wherein the first central core is positioned above the first mother board and the second central core is positioned below the first mother board; and a plurality of light passageways through the first mother board, wherein the light passageways afford optical communication between the first central core and the second central core.

10. The optical rack of claim 8, further comprising:

a first optical link chip associated with the first central core, wherein the first optical link chip directs routing of optic signals to central core photo transceivers and card photo transceivers that are associated with the first mother board; and a second optical link chip associated with the second central core, wherein the second optical link chip directs routing of optic signals to central core photo transceivers and card photo transceivers that are associated with the second mother board.

11. The optical rack of claim 8, wherein the central core photo transceivers comprise ends of optic fibers.

12. The optical rack of claim 8, wherein the central core photo transceivers comprise light emitting diodes powered by current from metal wires.

13. The optical rack of claim 8, wherein each of the central core photo transceivers comprise multiple light emitting diodes capable of producing different wavelengths.

14. The optical rack of claim 8, wherein the card photo transceivers comprise photoreceptors.

15. A computer system comprising an optical rack, wherein the optical rack comprises;

a first mother board and a second mother board, wherein the first mother board is inter-coupled to the second mother board by a first central core and a second central core, and wherein the first mother board is perpendicularly oriented below and abutting the first central core and the second mother board is perpendicularly oriented below and abutting the second central core;

a plurality of central core photo transceivers emerging from exterior side surfaces of the first and second central cores;

a plurality of retention slots on the first and second mother boards, wherein the retention slots radially extend away from the first and second central cores; and a plurality of cards held by the retention slots, wherein each of the plurality of cards comprises a set of card photo transceivers that optically communicate with the central core photo transceivers on the first and second central cores.

16. The computer system of claim 15, further comprising:

a first plurality of inter-core optical transceivers emerging from a first end of the first central core;

a second plurality of inter-core optical transceivers emerging from a second end of the second central core, wherein the first central core is positioned above the first mother board and the second central core is positioned below the first mother board; and a plurality of light passageways through the first mother board, wherein the light passageways afford optical communication between the first central core and the second central core.

17. The computer system of claim 15, further comprising:

a first optical link chip associated with the first central core, wherein the first optical link chip directs routing of optic signals to central core photo transceivers and card photo transceivers that are associated with the first mother board; and a second optical link chip associated with the second central core, wherein the second optical link chip directs routing of optic signals to central core photo transceivers and card photo transceivers that are associated with the second mother board.

18. The computer system of claim 15, wherein the central core photo transceivers comprise ends of optic fibers.

19. The computer system of claim 15, wherein the central core photo transceivers comprise light emitting diodes coupled to metal wires.

20. The computer system of claim 15, wherein each of the central core photo transceivers comprise multiple light emitting diodes capable of producing different wavelengths.

* * * * *